United States Patent
Kim

(10) Patent No.: US 10,775,931 B2
(45) Date of Patent: Sep. 15, 2020

(54) TOUCH DISPLAY DEVICE HAVING A POWER OUTPUT CIRCUIT, CONTROLLER, AND TOUCH DISPLAY PANEL

(71) Applicant: LG DISPLAY CO., LTD., Seoul (KR)

(72) Inventor: SangUk Kim, Seoul (KR)

(73) Assignee: LG DISPLAY CO., LTD., Seoul (KR)

( * ) Notice: Subject to any disclaimer, the term of this patent is extended or adjusted under 35 U.S.C. 154(b) by 209 days.

(21) Appl. No.: 16/108,864

(22) Filed: Aug. 22, 2018

(65) Prior Publication Data

US 2019/0102036 A1    Apr. 4, 2019

(30) Foreign Application Priority Data

Sep. 29, 2017  (KR) .......................... 10-2017-0127482

(51) Int. Cl.
  *G06F 3/041*  (2006.01)
  *G09G 3/20*   (2006.01)
  *G06F 3/044*  (2006.01)

(52) U.S. Cl.
  CPC .......... *G06F 3/04184* (2019.05); *G06F 3/044* (2013.01); *G06F 3/0412* (2013.01); *G06F 3/0416* (2013.01); *G06F 3/0443* (2019.05); *G09G 3/20* (2013.01); *G09G 2320/0271* (2013.01); *G09G 2330/02* (2013.01); *G09G 2354/00* (2013.01)

(58) Field of Classification Search
  CPC .................................................... G06F 3/0412
  See application file for complete search history.

(56) References Cited

U.S. PATENT DOCUMENTS

| | | | |
|---|---|---|---|
| 9,183,778 B2* | 11/2015 | Lee ........................ | G09G 3/003 |
| 9,665,208 B2* | 5/2017 | Kim ...................... | G06F 3/0412 |
| 9,753,575 B2* | 9/2017 | Chang .................. | G06F 3/0416 |
| 10,042,470 B2* | 8/2018 | Shin ...................... | G06F 3/0416 |
| 10,198,064 B2* | 2/2019 | Kwon .................. | G06F 3/0416 |
| 10,216,319 B2* | 2/2019 | Cho ...................... | G06F 3/0412 |
| 10,275,089 B2* | 4/2019 | Kim ...................... | G06F 3/0418 |

(Continued)

FOREIGN PATENT DOCUMENTS

| JP | 2015-79236 A | 4/2015 |
|---|---|---|
| KR | 10-2013-0132197 A | 12/2013 |

(Continued)

*Primary Examiner* — Patrick F Marinelli
(74) *Attorney, Agent, or Firm* — Birch, Stewart, Kolasch & Birch, LLP

(57) ABSTRACT

A touch display device can include a controller configured to output a synchronization signal having a first level during a display driving interval and having a second level during a touch driving interval; a power output circuit configured to receive the synchronization signal from the controller, in response to receiving the synchronization signal having the first level, set an output value of a high-potential voltage to a first voltage, and in response to receiving the synchronization signal having the second level, set the output value of the high-potential voltage to a second voltage that is lower than the first voltage; and a data driving circuit configured to receive image data from the controller, and output data voltages according to the image data by using the high-potential voltage received from the power output circuit to power the data driving circuit.

19 Claims, 12 Drawing Sheets

(56) References Cited

U.S. PATENT DOCUMENTS

| | | | | |
|---|---|---|---|---|
| 2012/0218482 | A1* | 8/2012 | Hwang | G06F 3/044 349/12 |
| 2016/0098151 | A1* | 4/2016 | Kim | G06F 3/0418 345/174 |
| 2016/0283032 | A1* | 9/2016 | Kim | G06F 3/0412 |
| 2017/0090624 | A1* | 3/2017 | Kwon | G06F 3/0416 |
| 2017/0090643 | A1* | 3/2017 | Kim | G06F 3/0412 |
| 2017/0090673 | A1* | 3/2017 | Kim | G06F 3/0418 |
| 2017/0115808 | A1* | 4/2017 | Cho | G06F 3/0412 |
| 2017/0139523 | A1* | 5/2017 | Chang | G06F 3/0416 |
| 2017/0300165 | A1* | 10/2017 | Shin | G06F 3/0416 |
| 2018/0074624 | A1* | 3/2018 | Zhang | G06F 3/0412 |
| 2018/0239488 | A1* | 8/2018 | Lin | G06F 3/0416 |
| 2019/0102036 | A1* | 4/2019 | Kim | G06F 3/0416 |
| 2019/0121468 | A1* | 4/2019 | Jun | G02F 1/13338 |

FOREIGN PATENT DOCUMENTS

| | | |
|---|---|---|
| KR | 10-2014-0017881 A | 2/2014 |
| KR | 10-2015-0138922 A | 12/2015 |
| KR | 10-2017-0039055 A | 4/2017 |

* cited by examiner

FIG.10

|  | Output gray | Output gray according to LHB influence | LHB ODC-corrected gray | Final output gray |
|---|---|---|---|---|
| #1 | 127 | 120 | 134 | 127 |
| #2 | 127 | 124 | 130 | 127 |
| #3 | 127 | 127 | 127 | 127 |
| ... | ... | ... | ... | ... |
| #159 | 127 | 122 | 132 | 127 |
| #160 | 127 | 123 | 131 | 127 |

TOUCH DISPLAY DEVICE HAVING A POWER OUTPUT CIRCUIT, CONTROLLER, AND TOUCH DISPLAY PANEL

CROSS REFERENCE TO RELATED APPLICATION

This application claims priority from Korean Patent Application No. 10-2017-0127482, filed in the Republic of Korea on Sep. 29, 2017, the entirety of which is hereby incorporated by reference for all purposes as if fully set forth herein.

BACKGROUND OF THE INVENTION

Field of the Invention

The present disclosure relates to a power output circuit, a controller, a touch display panel, and a touch display device.

Description of the Related Art

With the advancement of an information-oriented society, various requirements for display devices that display images have been increasing, and use has been made of various types of display devices, such as Liquid Crystal Display (LCD) devices, plasma display devices, and Organic Light-Emitting Display (OLED) devices.

Recently, in order to provide more functions to users, such a display device provides a function of recognizing a user's touch to a display panel and performing input processing based on the recognized touch.

Such a touch display device may include a touch sensor (or touch electrodes) arranged on a display panel or may include a touch sensor mounted within a display panel, and may sense a user's touch by sensing a change in capacitance which occurs when the user touches the display panel.

When a display panel has a touch sensor mounted therewithin, in the display panel, electrodes used for display driving may be utilized as a touch sensor.

As an example, when a touch display device is an LCD device, common electrodes, to which a common voltage is applied during display driving, may be utilized as touch electrodes.

That is, during a display driving interval, a common voltage may be applied to common electrodes to perform display driving, and during a touch driving interval, a touch driving signal may be applied to common electrodes serving as touch electrodes to sense a touch to the display panel.

Therefore, display driving and touch driving are performed during intervals which are temporally distinguished from each other. Also, in one image frame, display driving and touch driving may be alternately performed multiple times.

Accordingly, a voltage or signal applied to the display panel during a display driving interval fails to be applied during a touch driving interval, and is applied to the display panel after the touch driving interval ends.

Also, there is a problem in that, during a display driving interval after the touch driving interval, a voltage or signal applied to the display panel could fail to be normally output.

As an example, when a high-potential voltage used to output a data voltage is output during a display driving interval after a touch driving interval, the output level of a high-potential voltage may become low due to a load of the display panel. Also, as the output level of a high-potential voltage becomes low, there may occur a difference between data voltages which are output using the high-potential voltage.

Due to such a drop in the output level of a high-potential voltage during a display driving interval that occurs after a touch driving interval or due to such a difference between output levels of data voltages, an image abnormality may appear on the display panel, such as a horizontal band. Also, there is a problem in that, due to the load of the display panel increasing as the size of the display panel becomes larger, the image abnormality may more easily appear or be more recognizable.

SUMMARY OF THE INVENTION

An aspect of the present disclosure is to provide a touch display panel and a touch display device which can prevent an image abnormality that may appear during display driving in a touch display device, which performs display driving and touch driving in a time-division manner.

Another aspect of the present disclosure is to provide a power output circuit that can prevent a drop in the output level of a high-potential voltage which is output during a display driving interval that occurs after a touch driving interval.

Still another aspect of the present disclosure is to provide a controller that can prevent a difference between output levels of data voltages due to a drop in the output level of a high-potential voltage during a display driving interval that occurs after a touch driving interval.

In accordance with an aspect of the present disclosure, a touch display device can include a controller configured to output a synchronization signal having a first level during a display driving interval and output a synchronization signal having a second level during a touch driving interval; and a power output circuit configured to receive the synchronization signal from the controller, when the synchronization signal having the first level is received, set an output value of a high-potential voltage to a first voltage, and when the synchronization signal having the second level is received, set the output value of the high-potential voltage to a second voltage.

In the touch display device, the first voltage can be higher than the second voltage, and the touch display device can further include a data driving circuit configured to receive image data from the controller, and output data voltages according to the image data by using the high-potential voltage received from the power output circuit.

In accordance with another aspect of the present disclosure, a touch display device can include a touch display panel having multiple gate lines and multiple data lines arranged therein, having multiple touch electrodes arranged therein, and in one image frame, operating in a display mode during at least two display driving intervals and operating in a touch mode during at least two touch driving intervals; a data driving circuit configured to drive the multiple data lines arranged in the touch display panel; and a controller configured to control the data driving circuit.

In the touch display device, the controller can be configured to output, to the data driving circuit, image data obtained by upwardly adjusting a gradation of external data received from an outside during the at least two display driving intervals, and differently upwardly adjust a gradation of the external data according to an order in which the image data is output to the data driving circuit.

In accordance with still another aspect of the present disclosure, a touch display device can include a touch display panel having multiple gate lines and multiple data lines arranged therein, and having multiple touch electrodes arranged therein, in which a display driving voltage is applied to the multiple touch electrodes during at least two display driving intervals in one image frame, and a touch driving signal is applied to the multiple touch electrodes during at least two touch driving intervals; a data driving circuit configured to drive the multiple data lines; a controller configured to output image data to the data driving circuit; and a power output circuit configured to output a high-potential voltage to the data driving circuit, wherein the data driving circuit is configured to, during the display driving interval, receive at least one of the image data obtained by upwardly adjusting a gradation of external data that the controller receives from an outside, and the high-potential voltage of which an output value is set to be higher than a reference voltage and which is received from the power output circuit.

In accordance with yet another aspect of the present disclosure, a touch display panel can include a first touch electrode group to which a display driving voltage is applied during a first display driving interval, and to which a touch driving signal is applied during a first touch driving interval after the first display driving interval; and a second touch electrode group to which a display driving voltage is applied during a second display driving interval after the first touch driving interval, and to which a touch driving signal is applied during a second touch driving interval after the second display driving interval.

In the touch display panel, sub-pixels overlapping the first touch electrode group can be configured to receive data voltages having a first level for a first term in the first display driving interval, receive data voltages having a second level lower than the first level for a second term after the first term, and express an identical gradation for the first term and the second term.

In accordance with still yet another aspect of the present disclosure, a power output circuit can include a synchronization signal receiver configured to receive, from a controller, a synchronization signal having a first level or a synchronization signal having a second level; and a high-potential voltage output unit configured to, when the synchronization signal having the first level is received, output a high-potential voltage which is set to a first voltage, and when the synchronization signal having the second level is received, output the high-potential voltage which is set to a second voltage lower than the first voltage.

In accordance with further aspect of the present disclosure, a controller can include an external data receiver configured to receive external data from an outside; and an image data output unit configured to output image data by upwardly adjusting a gradation of the external data, adjust external data having a first gradation into image data having a second gradation different from the first gradation and output the image data having the second gradation for a first term in a display driving interval, and adjust external data having a first gradation into image data having a third gradation different from the second gradation and output the image data having the third gradation for a second term after the first term.

According to embodiments of the present disclosure, an output value of a high-potential voltage can be set to be higher than a reference voltage during a display driving interval after a touch driving interval, to reduce a drop in the output level of a high-potential voltage due to a load of a display panel during a display driving interval.

According to embodiments of the present disclosure, an overdriven data voltage can be output according to the order, in which data voltages are output, during a display driving interval after a touch driving interval, to reduce the difference between output levels of data voltages.

According to embodiments of the present disclosure, a drop in the output level of a high-potential voltage and the difference between output levels of data voltages can be reduced during a display driving interval, to prevent an image abnormality that may appear on a display panel, such as a horizontal band.

BRIEF DESCRIPTION OF THE DRAWINGS

The above and other aspects, features, and advantages of the present disclosure will be more apparent from the following detailed description taken in conjunction with the accompanying drawings, in which:

FIGS. 8 to 10 are views illustrating examples of a data voltage output from a data driving circuit according to image data output from the controller of FIG. 7, according to embodiments of the present disclosure;

DETAILED DESCRIPTION OF THE EXEMPLARY EMBODIMENTS

Figure 1:
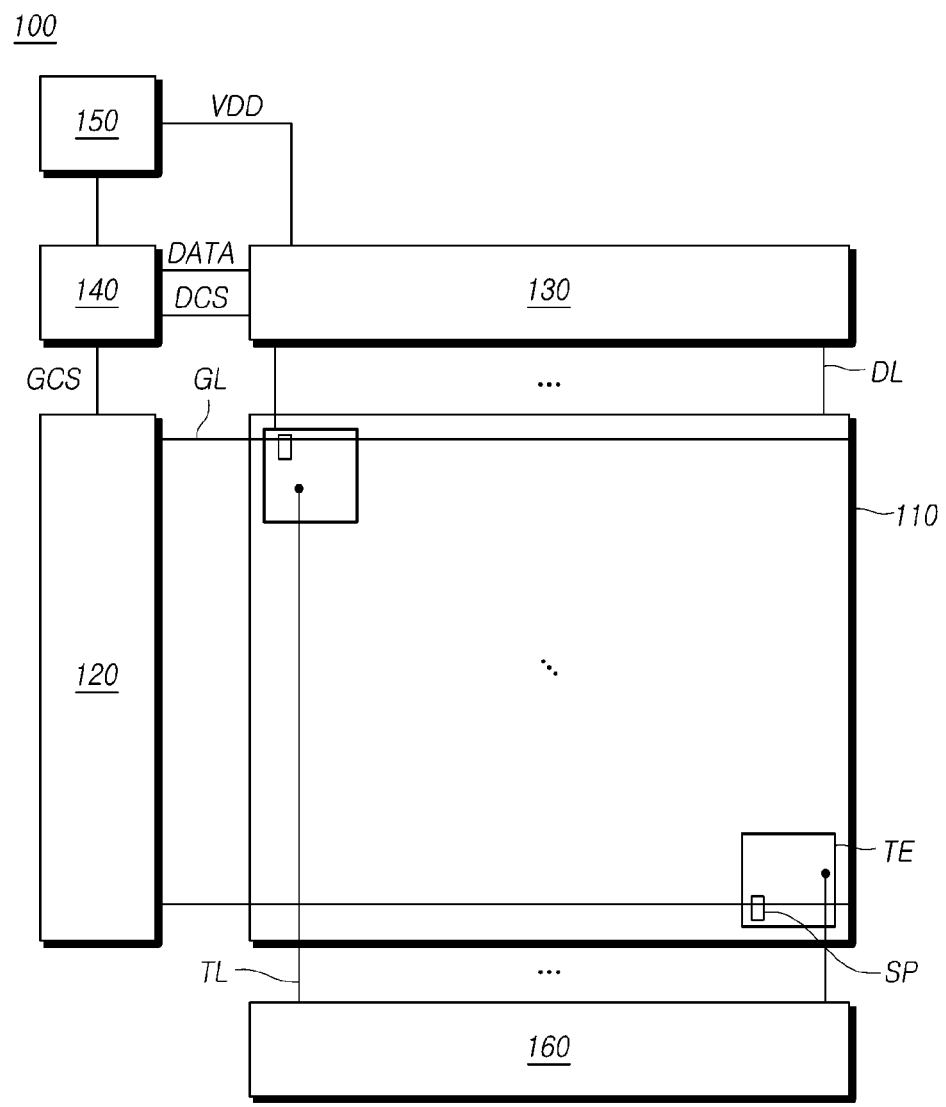
FIG. 1 is a view illustrating a schematic configuration of a touch display device according to embodiments of the present disclosure.

Hereinafter, embodiments of the present disclosure will be described in detail with reference to the accompanying drawings. In assigning reference numerals to elements in the drawings, the same reference numerals will designate the same elements where possible although they are shown in different drawings. Also, in the following description of the present disclosure, a detailed description of known functions and configurations incorporated herein will be omitted when it may make the subject matter of the present disclosure rather unclear.

In addition, such terms as "first," "second," "A," "B," "(a)," "(b)," and the like, may be used herein when describing elements of the present disclosure. These terms are merely used to distinguish one element from other elements, and the essence of a corresponding element, an order thereof, a sequence thereof, or the number of the corresponding elements are not limited by the terms. When an element is described as being "connected," "coupled," or "linked" to another element, it will be understood that the element may not only be directly connected or coupled to said another element, but may also be "connected," "coupled," or "linked" to said another element through a third element, or the third element may also be interposed between the element and said another element.

FIG. 1 is a view illustrating a schematic configuration of a touch display device 100 according to embodiments of the present disclosure.

Referring to FIG. 1, as elements for display driving, the touch display device 100 according to embodiments of the present disclosure can include a touch display panel 110, a gate driving circuit 120, a data driving circuit 130, a controller 140, a power output circuit 150, and the like.

Also, as elements for touch driving, the touch display device 100 according to embodiments of the present disclosure can include multiple touch lines TL arranged in the touch display panel 110, multiple touch electrodes TE arranged therein, and a touch driving circuit 160 configured to drive the multiple touch lines TL and the multiple touch electrodes TE.

In the touch display panel 110, multiple gate lines GL, multiple data lines DL, multiple sub-pixels SP, and the like may be arranged.

The gate driving circuit 120 outputs a scan signal to the multiple gate lines GL to control driving timing of the multiple sub-pixels SP arranged in the touch display panel 110.

Under the control of the controller 140, the gate driving circuit 120 sequentially supplies a scan signal of an on-voltage or an off-voltage to the multiple gate lines GL to sequentially drive the multiple gate lines GL.

According to a driving scheme, the gate driving circuit 120 can be disposed at one side of the touch display panel 110, or can be arranged at both sides thereof.

Also, the gate driving circuit 120 can include one or more gate driver integrated circuits.

Each of the gate driver integrated circuits can be connected to a bonding pad of the touch display panel 110 by using a Tape-Automated-Bonding (TAB) scheme or a Chip-On-Glass (COG) scheme, or can be implemented in a Gate-In-Panel (GIP) type to be directly disposed in the touch display panel 110.

Alternatively, the gate driver integrated circuits can be integrated into the touch display panel 110 to be arranged therein, or can be implemented using a Chip-On-Film (COF) scheme in which the gate driver integrated circuits are mounted on a film connected to the touch display panel 110.

The data driving circuit 130 outputs data voltages to the data lines DL in line with timing at which a scan signal is applied to the gate lines GL, and causes the sub-pixels SP to express respective brightnesses according to image data.

When particular gate lines GL are open (e.g., in an on-state), the data driving circuit 130 converts image data DATA received from the controller 140 into data voltages having an analog form and supplies the same to the multiple data lines DL to drive the multiple data lines DL.

The data driving circuit 130 can include one or more source driver integrated circuits to drive the multiple data lines DL.

Each of the source driver integrated circuits can be connected to a bonding pad of the touch display panel 110 by using a TAB scheme or a COG scheme, can be directly disposed in the touch display panel 110, or can be integrated into the touch display panel 110 to be disposed therein.

Alternatively, each of the source driver integrated circuits can be implemented using a COF scheme. In the present example, one end of each source driver integrated circuit can be bonded to at least one source printed circuit board, and the other end thereof can be bonded to the touch display panel 110.

The controller 140 supplies various control signals to the gate driving circuit 120 and the data driving circuit 130 to control operations of the gate driving circuit 120 and the data driving circuit 130.

The controller 140 starts a scan according to timing implemented in each frame, changes input image data (or external data) received from the outside according to a data signal format used in the data driving circuit 130 to output the changed image data, and controls data driving according to an appropriate time in line with the scan.

The controller 140 can receive various timing signals, including a vertical synchronization signal Vsync, a horizontal synchronization signal Hsync, an input Data Enable (DE) signal, a clock signal CLK, and the like, as well as the input image data from the outside (e.g., a host system).

In addition to changing the input image data received from the outside according to the data signal format used in the data driving circuit 130 and outputting the changed image data, in order to control the gate driving circuit 120 and the data driving circuit 130, the controller 140 can generate various control signals by using the received timing signals, and can output the same to the gate driving circuit 120 and the data driving circuit 130.

As an example, in order to control the gate driving circuit 120, the controller 140 outputs various gate control signals GCS, including a gate start pulse GSP, a gate shift clock GSC, a gate output enable signal GOE, and the like.

In the present example, the gate start pulse GSP controls operation start timing of one or more gate driver integrated circuits constituting the gate driving circuit 120. The gate shift clock GSC is a clock signal commonly input to one or more gate driver integrated circuits, and controls shift timing of a scan signal. The gate output enable signal GOE designates timing information of one or more gate driver integrated circuits.

Also, in order to control the data driving circuit 130, the controller 140 outputs various data control signals DCS, including a source start pulse SSP, a source sampling clock SSC, a source output enable signal SOE, and the like.

In the present example, the source start pulse SSP controls data sampling start timing of one or more source driver integrated circuits constituting the data driving circuit 130. The source sampling clock SSC is a clock signal for controlling sampling timing of data in each source driver integrated circuit. The source output enable signal SOE controls output timing of the data driving circuit 130.

The controller 140 can be disposed on a control printed circuit board that is connected to a source printed circuit board, to which source driver integrated circuits are bonded, through a connection medium such as a Flexible Flat Cable (FFC) or a Flexible Printed Circuit (FPC).

The control printed circuit board can further include a power controller that is disposed thereon and is configured to supply various voltages or currents to the touch display panel 110, the gate driving circuit 120, the data driving circuit 130, and the like, or is configured to control various voltages or currents to be supplied.

As an example, as illustrated in FIG. 1, the control printed circuit board can include the power output circuit 150 that is disposed thereon and is configured to output a high-potential voltage VDD to the data driving circuit 130. The power output circuit 150 can be a power management integrated circuit or a boost integrated circuit.

The power output circuit 150 outputs, to the data driving circuit 130, the high-potential voltage VDD used to generate a gamma voltage GMA in the data driving circuit 130. The data driving circuit 130 generates data voltages according to the image data DATA received from the controller 140 by using the gamma voltage GMA, and supplies the generated data voltages to the sub-pixels SP, respectively.

In order to sense a user's touch to the touch display panel 110, the touch display device 100 according to embodiments of the present disclosure can include the multiple touch electrodes TE, the multiple touch lines TL, and the touch driving circuit 160.

Figure 2:
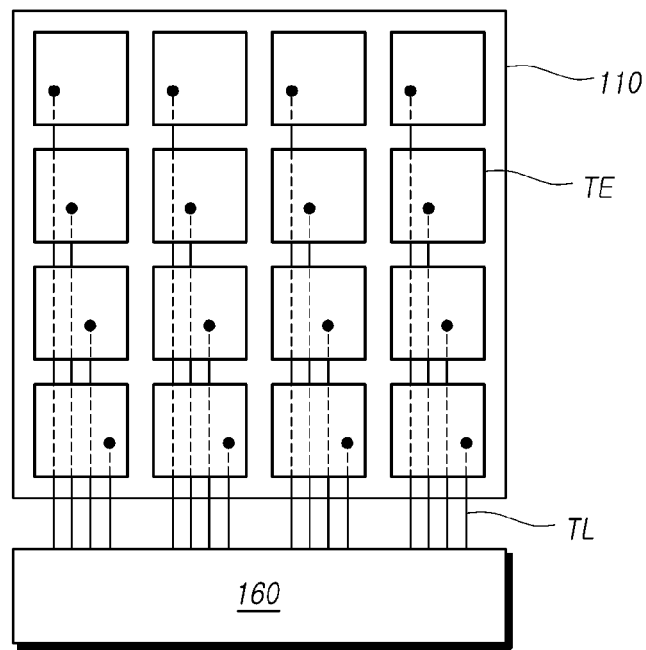
FIG. 2 is a view schematically illustrating a configuration for touch driving in a touch display device according to embodiments of the present disclosure.

FIG. 2 is a view illustrating an example of a configuration for touch sensing in the touch display device 100 according to embodiments of the present disclosure.

Referring to FIG. 2, the touch display device 100, according to embodiments of the present disclosure, can include the touch display panel 110 in which the multiple touch electrodes TE and the multiple touch lines TL are arranged.

The multiple touch electrodes TE can be mounted within the touch display panel 110, or can be arranged on the touch display panel 110.

As an example, when the touch display device 100 is implemented by an LCD device, common electrodes to which a common voltage Vcom is applied during display driving can be used as touch electrodes TE.

In the present example, a display driving voltage can be applied to the touch electrodes TE during display driving, and a touch driving signal can be applied thereto during touch driving.

That is, when a touch screen panel (e.g., touch electrodes) is mounted within a display panel as in an in-cell type, an on-cell type, and the like, electrodes (e.g., common electrodes) utilized for display driving can be utilized as touch electrodes TE. In the present example, since one electrode serves as both a display driving electrode and a touch electrode TE, it performs display driving for image display and touch driving for touch sensing during temporally-divided intervals.

Alternatively, when the touch display device 100 is implemented by an OLED device, touch electrodes TE can be arranged on an encapsulation layer disposed on organic light-emitting diodes. In the present example, the touch electrodes TE can be arranged in the form of a film touch sensor on the encapsulation layer.

Multiple touch electrodes TE, each of which is connected to one touch line TL, can be arranged in a structure in which the multiple electrodes TE are separated from each other. Alternatively, TX electrodes, to which a touch driving signal output from the touch driving circuit 160 is applied, and RX electrodes, which the touch driving circuit 160 uses to receive touch sensing signals, can be arranged in the direction of intersection between the former and the latter.

Multiple touch lines TL are arranged in the touch display panel 110, and connect the touch electrodes TE and the touch driving circuit 160 to each other.

As an example, the multiple touch lines TL can be arranged in an area where the multiple touch lines TL overlap the multiple touch electrodes TE, and can be connected to the multiple touch electrodes TE through contact holes or the like. In the present example, each of the multiple touch lines TL may be connected to one touch electrode TE, and may overlap the other touch electrodes TE in the state of being insulated from the other touch electrodes TE.

Alternatively, multiple touch lines TL can be arranged along an edge area of the touch display panel 110 to be connected to multiple touch electrodes TE.

During a touch driving interval, the touch driving circuit 160 applies a touch driving signal to the multiple touch electrodes TE, receives touch sensing signals, and senses a user's touch to the touch display panel 110.

The touch driving circuit 160 can sense whether there is the user's touch and the position of the touch by sensing a variation of a capacitance which occurs when the user touches the touch display panel 110, and can detect the user's touch through self-capacitance sensing or mutual-capacitance sensing. Alternatively, the touch driving circuit 160 may sense the user's touch by alternately performing self-capacitance sensing or mutual-capacitance sensing.

When a touch is sensed through self-capacitance sensing, the touch driving circuit 160 can output a touch driving signal through a touch line TL connected to each touch electrode TE, can receive a touch sensing signal through the relevant touch line TL, and can sense the user's touch by using the received touch sensing signal.

When a touch is sensed through mutual-capacitance sensing, the touch driving circuit 160 may output a touch driving signal through a touch line TL connected to a TX electrode among the touch electrodes TE, may receive a touch sensing signal through a touch line TL connected to an RX electrode, and may sense the user's touch by using the received touch sensing signal.

The touch driving circuit 160 can sense the user's touch to the touch display panel 110 by driving the touch electrodes TE during a touch driving interval which, together with a display driving interval, is temporally divided.

As an example, the touch driving circuit 160 can perform an operation for touch sensing during a Vertical Blank (V-Blank) interval between intervals during which the display is driven (e.g., a V-Blank sensing scheme). Alternatively, one frame period can be temporally divided into multiple display driving intervals and multiple touch driving intervals, and display driving and touch driving can be alternately performed (e.g., an LHB sensing scheme).

Figure 3:
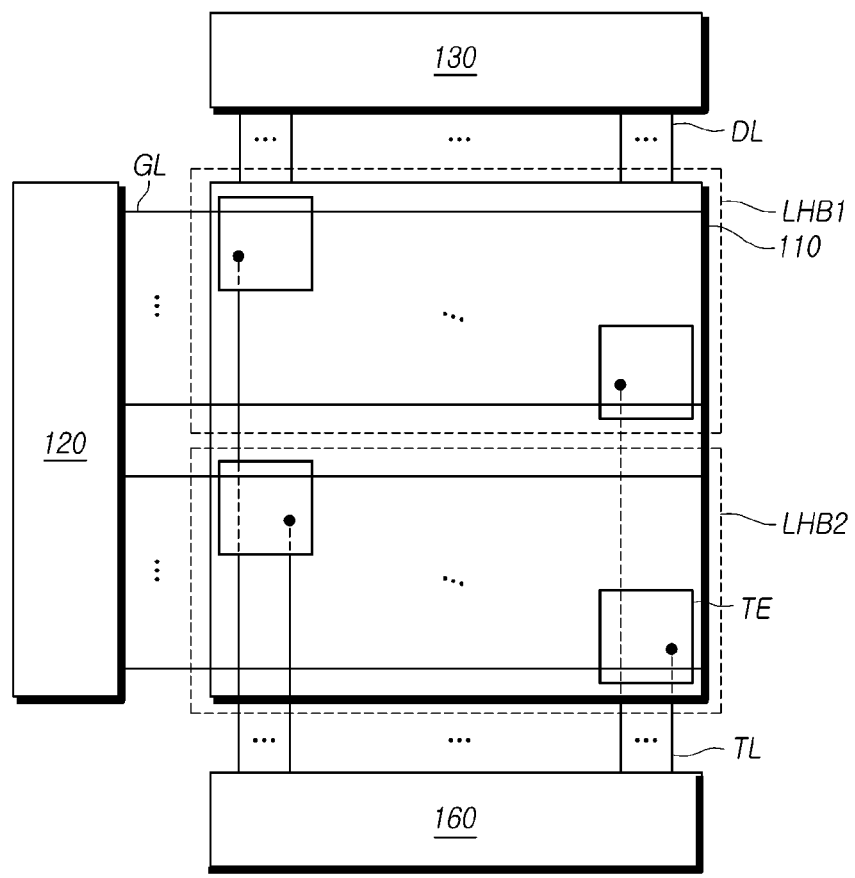
FIGS. 3 and 4 are views illustrating examples of a scheme and timing for which a touch display device performs display driving and touch driving according to embodiments of the present disclosure.

FIG. 3 is a view illustrating an example of a situation in which the touch display device 100, according to embodiments of the present disclosure, senses a touch by using an LHB sensing scheme. In FIG. 3, a situation in which the touch display device 100 is implemented by an LCD device will be described as an example.

Referring to FIG. 3, in the touch display device 100 according to embodiments of the present disclosure, the touch display panel 110 can be divided into a first touch display block LHB1 and a second touch display block LHB2. Alternatively, the touch display panel 110 can be divided into a first touch electrode group and a second touch electrode group.

In one frame period, during a first display driving interval, the first touch display block LHB1 operates in a display mode. That is, touch electrodes TE arranged in the first touch display block LHB1 may receive a display driving voltage applied thereto during a first display driving interval.

Specifically, during the first display driving interval, a scan signal is applied to multiple gate lines GL arranged in the first touch display block LHB1, and data voltages are applied to sub-pixels SP arranged in the first touch display block LHB1 through multiple data lines DL.

In the present example, a common voltage Vcom for display driving is applied to the multiple touch electrodes TE arranged in the first touch display block LHB1.

During a first touch driving interval after the first display driving interval, the first touch display block LHB1 may operate in a touch mode.

That is, during the first touch driving interval, a touch driving signal is applied to the multiple touch electrodes TE arranged in the first touch display block LHB1. The touch driving circuit 160 can receive touch sensing signals from the touch electrodes TE to which the touch driving signal is applied, and sense the user's touch to the touch display panel 110 by using the received touch sensing signals.

Then, when the first touch driving interval ends, during a second display driving interval, the second touch display block LHB2 operates in a display mode. When the second display driving interval ends, during a second touch driving interval, the second touch display block LHB2 operates in a touch mode.

Accordingly, the touch display panel 110 is divided into multiple touch display blocks, and can alternately perform display driving and touch driving for each block in one frame period.

In the present example, the situation in which the number of the touch display blocks is 2 is described as an example, but the touch display blocks can be variously configured such that the number thereof is set to 4, 8, 16, or the like.

When touch driving is performed by using the LHB sensing scheme, a voltage or a signal output for display driving may not be normally output during a display driving interval between touch driving intervals.

Figure 4:
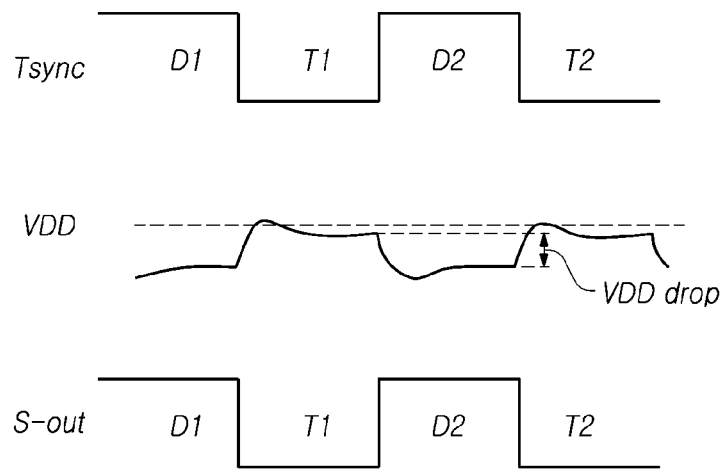

FIG. 4 is a view illustrating an example of a high-potential voltage VDD and a data voltage, which are output for display driving, when the touch display device 100 according to embodiments of the present disclosure senses a touch by using the LHB sensing scheme as illustrated in FIG. 3.

Referring to FIG. 4, a touch synchronization signal Tsync can be output which has different levels according to whether a corresponding driving interval is a display driving interval or a touch driving interval.

In the present example, the touch synchronization signal Tsync may refer to a synchronization signal capable of distinguishing a display driving interval from a touch driving interval, and may be a signal for synchronization in an image frame. In the present disclosure, for convenience of description, a synchronization signal indicated by Tsync is described as a touch synchronization signal, but the present disclosure is not limited thereto.

The touch synchronization signal Tsync can be output from the controller 140. Alternatively, the touch synchronization signal Tsync may be output from a touch controller configured to control touch driving, or may be output from an integrated controller configured to control both display driving and touch driving.

The controller 140 can output the touch synchronization signal Tsync of which the level is a first level (e.g., a high level) during a display driving interval and is a second level (e.g., a low level) during a touch driving interval.

The touch synchronization signal Tsync output from the controller 140 can be delivered to the gate driving circuit 120 and the data driving circuit 130. Also, the touch synchronization signal Tsync output from the controller 140 may be delivered to the touch driving circuit 160 or the touch controller configured to control the touch driving circuit 160.

That is, the touch display device 100 operates in a display or touch mode according to the touch synchronization signal Tsync output from the controller 140.

During a display driving interval, that is, an interval during which the touch synchronization signal Tsync has the first level, the power output circuit 150 outputs a high-potential voltage VDD to the data driving circuit 130. Then, the data driving circuit 130 generates and outputs data voltages based on image data, received from the controller 140, by using the high-potential voltage VDD and the like.

During a touch driving interval after the display driving interval, the touch display device 100 operates in a touch mode, and thus, the data driving circuit 130 does not output data voltages.

Then, when a corresponding driving interval again becomes a display driving interval, the touch display device 100 operates in a display mode, and the data driving circuit 130 outputs data voltages.

In the present example, it can be noted that the output level of the high-potential voltage VDD suddenly drops during a display driving interval after a touch driving interval. That is, during a display driving interval that occurs after a touch driving interval, the output level of the high-potential voltage VDD may drop according to a sudden increase in a load of the touch display panel 110.

Also, when the touch display panel 110 is divided into multiple touch display blocks and operates using the LHB sensing scheme, a drop in the output level of the high-potential voltage VDD may occur due to the difference between loads of the touch display blocks.

The drop in the output level of the high-potential voltage VDD may cause a difference between output levels of data voltages, and thus, a problem may occur in that an image abnormality appears on the touch display panel 110, such as a horizontal band.

Embodiments of the present disclosure provide the touch display device 100 operating in an LHB sensing scheme that can prevent an image abnormality, which may appear on the touch display panel 110, by reducing a drop in the output level of a high-potential voltage VDD and/or by reducing a difference between output levels of data voltages.

Figure 5:
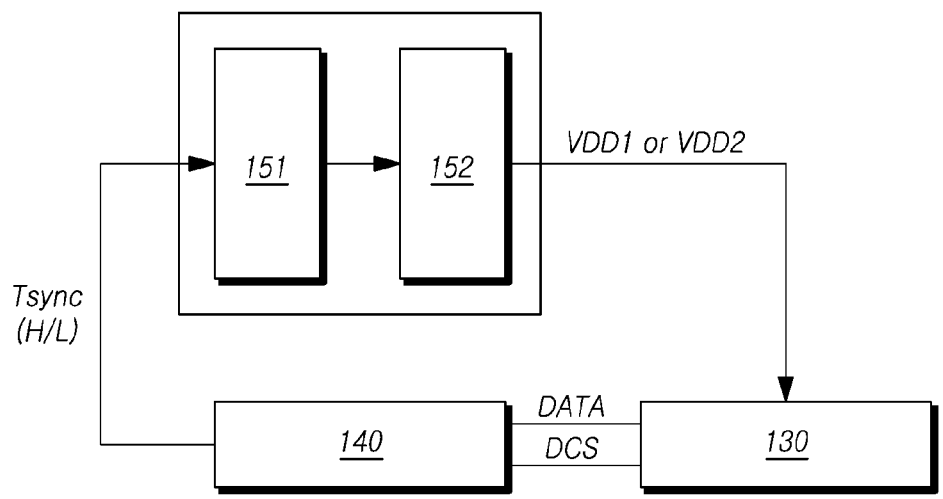
FIG. 5 is a view illustrating an example of a configuration of a power output circuit in a touch display device according to embodiments of the present disclosure.

FIG. 5 is a view illustrating an example of a configuration of the power output circuit 150 in the touch display device 100 according to embodiments of the present disclosure.

Referring to FIG. 5, the power output circuit 150 of the touch display device 100 according to embodiments of the present disclosure can include a synchronization signal receiver 151 and a high-potential voltage output unit 152.

The power output circuit 150 receives a touch synchronization signal output from the controller 140, and outputs a high-potential voltage VDD to the data driving circuit 130.

In the present example, during a display driving interval, the power output circuit 150 can set an output value of the high-potential voltage VDD to be higher than an output value thereof provided during a touch driving interval, and can output the high-potential voltage VDD having the set output value.

Specifically, the synchronization signal receiver 151 of the power output circuit 150 receives a touch synchronization signal Tsync having a first level (e.g., a high level) or a second level (e.g., a low level) output from the controller 140.

The synchronization signal receiver 151 can deliver the received touch synchronization signal Tsync to the high-potential voltage output unit 152, and the high-potential voltage output unit 152 can set an output value (e.g., voltage level) of a high-potential voltage VDD according to the touch synchronization signal Tsync.

As an example, when a touch synchronization signal Tsync having the first level (e.g., high level) is received, the high-potential voltage output unit 152 can set an output value of a high-potential voltage VDD to a first voltage (e.g., VDD1). Also, when a touch synchronization signal Tsync having the second level (e.g., low level) is received, the high-potential voltage output unit 152 can set an output value of a high-potential voltage VDD to a second voltage (e.g., VDD2).

In the present example, the first voltage can be set to be higher than the second voltage. Also, the second voltage can be a reference voltage which is set as a base value (e.g., default level or reference voltage) of the high-potential voltage VDD.

That is, when a touch synchronization signal Tsync having the first level is received during a display driving interval, the high-potential voltage output unit 152 sets an output value of the high-potential voltage VDD to be high. When a touch synchronization signal Tsync having the second level (e.g., low level) is received during a touch driving interval, the high-potential voltage output unit 152 sets an output value of the high-potential voltage VDD to be relatively low.

Accordingly, during a display driving interval, an output value of the high-potential voltage VDD is set to be higher than the reference voltage, so that a drop in the output level of the high-potential voltage VDD can be reduced (e.g., VDD is increased to compensate for a drop in voltage).

Also, the data driving circuit 130 receives the high-potential voltage VDD of which the output value is set to be high, and generates data voltages by using the same, so that it is possible to prevent a drop in the output level of the high-potential voltage VDD from causing a difference between output levels of data voltages or an image abnormality.

Figure 6:
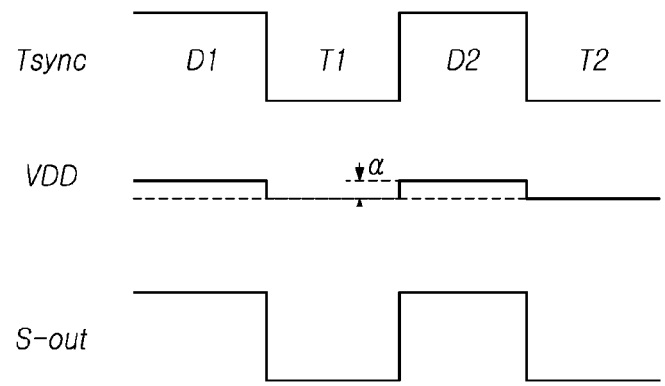
FIG. 6 is a view illustrating an example of a high-potential voltage which is output from the power output circuit illustrated in FIG. 5, according to an embodiment of the present disclosure.

FIG. 6 is a view illustrating an example of a high-potential voltage VDD which is output from the power output circuit 150 illustrated in FIG. 5.

Referring to FIG. 6, the controller 140 outputs a touch synchronization signal Tsync having a first level (e.g., high level) during a first display driving interval, and outputs a touch synchronization signal Tsync having a second level (e.g., low level) during a first touch driving interval.

When a touch synchronization signal Tsync having the first level (e.g., high level) is received from the controller 140, the power output circuit 150 outputs a high-potential voltage VDD of which the output value is set to a first voltage (e.g., the higher VDD level).

Also, when a touch synchronization signal Tsync having the second level (e.g., low level) is received from the controller 140, the power output circuit 150 outputs a high-potential voltage VDD of which the output value is set to a second voltage (e.g., the lower VDD level or the default VDD level).

That is, an output value of the high-potential voltage VDD which is set during a display driving interval is set to be higher by a predetermined voltage a than an output value thereof which is set during a touch driving interval. For example, the VDD can be raised a little during the display driving interval in order to compensate for a voltage drop caused by a load due to the preceding touch driving interval.

During a display driving interval, the power output circuit 150 outputs the high-potential voltage VDD of which the output value is set to be high, making it possible to reduce a drop in the output level of the high-potential voltage VDD.

Accordingly, it is possible to prevent a drop in the output level of the high-potential voltage VDD from causing a drop in the output level of a data voltage, etc. For example, VDD can be maintained at a constant level across adjacent touch driving and display driving intervals.

Even when an output value of the high-potential voltage VDD is set to be high during a display driving interval, a difference between output levels of data voltages may also occur, which are output using the high-potential voltage VDD of which the output value is set to be high (e.g., the same white data value may result in different shades of white at different locations on the display, even when the same white level is supposed to be displayed).

Particularly, as the size of the touch display panel 110 becomes larger, there may occur a difference between output levels of data voltages according to positions of sub-pixels SP supplied with data voltages.

Embodiments of the present disclosure provide a method capable of reducing the difference between output levels of data voltages output during a display driving interval by the touch display device 100 operating in an LHB sensing scheme.

Figure 7:
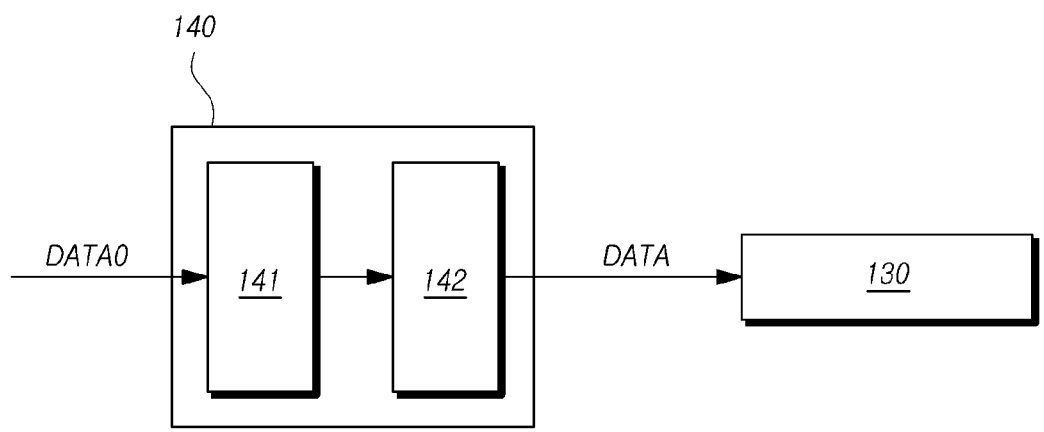
FIG. 7 is a view illustrating an example of a configuration of a controller in a touch display device according to embodiments of the present disclosure.

FIG. 7 is a view illustrating an example of a configuration of the controller 140 in the touch display device 100 according to embodiments of the present disclosure.

Referring to FIG. 7, the controller 140 of the touch display device 100 according to embodiments of the present disclosure can include an external data receiver 141 configured to receive input image data (or external data) from the outside (e.g., a host system), and an image data output unit 142 configured to convert the received external data DATA0 into image data DATA and output the image data DATA.

The external data receiver 141 of the controller 140 receives external data DATA0 transmitted from the outside, such as a host system. The image data output unit 142 of the controller 140 converts the external data DATA0 into image data DATA (e.g., compensated image data) usable in the data driving circuit 130 and outputs the image data DATA to the data driving circuit 130.

The data driving circuit 130 generates data voltages based on image data DATA received from the controller 140, and supplies the generated data voltages to pixels SP, respectively.

In the present example, the image data output unit 142 can generate image data DATA by upwardly adjusting the gradation of external data DATA0 received from the outside (e.g., it can make some image data brighter for certain pixels).

As an example, when the external data receiver 141 receives external data DATA0 having 120 gray from the outside, the image data output unit 142 may upwardly adjust the gradation of the external data DATA0 having 120 gray and output, to the data driving circuit 130, image data DATA corresponding to 125 gray (e.g., 120 gray could be adjusted brighter into 125 gray).

Then, the data driving circuit 130 outputs data voltages based on the image data DATA, having the upwardly-adjusted gradation, received from the controller 140.

That is, the data driving circuit 130 outputs data voltages corresponding to the image data DATA obtained by adjusting the gradation of external data DATA0 to have a gradation higher than that of the external data DATA0, and thus outputs overdriven data voltages as compared with actual data voltages.

Accordingly, data voltages are output to have levels higher than those of actual data voltages (e.g., the originally requested input data voltages), making it possible to prevent drops in output levels of the data voltages.

Also, the image data output unit 142 of the controller 140 according to embodiments of the present disclosure may adjust the gradation of external data DATA0 and may obtain and output image data DATA having a gradation higher than that of the external data DATA0, whereby the image data DATA can be output to reduce the difference between output levels of data voltages.

As described above, the image data output unit 142 adjusts the gradation of external data DATA0 to obtain and output image data DATA having a gradation that is higher than that of the external data DATA0 (e.g., the original input data).

In the present example, a ratio, in which a gradation of image data DATA output for a first term in one display driving interval is upwardly adjusted, can be different from a ratio, in which a gradation of image data DATA output for a second term after the first term is upwardly adjusted. Alternatively, gradations of pieces of image data DATA can be upwardly adjusted with different ratios according to the order in which the pieces of image data DATA are output by the display panel (e.g., image data for the first few lines on the display can be adjusted higher than image data for the last few lines on the display).

As an example, the image data output unit 142 can set a first ratio, in which a gradation of image data DATA output for the first term in a display driving interval is upwardly adjusted, to be higher than a second ratio, in which a gradation of image data DATA output for the second term is upwardly adjusted.

That is, for the first term in the display driving interval, the image data output unit 142 can upwardly adjust external data DATA0 having 120 gray into image data DATA having 125 gray, and for the second term, can upwardly adjust external data DATA0 having 120 gray into image data DATA having 123 gray.

Then, for the first term in the display driving interval, the data driving circuit 130 outputs data voltages corresponding to 125 gray, and for the second term in the display driving interval, outputs data voltages corresponding to 123 gray, even when both had the original input data specifying 120 gray.

In the present example, a sub-pixel SP, to which a data voltage corresponding to 125 gray is applied for the first term, and a sub-pixel SP, to which a data voltage corresponding to 123 gray is applied for the second term, identically express 120 gray (e.g., the same input image data for different parts of the display can be adjusted higher with different adjustment amounts, in order to display the same brightness level to the viewer).

Since drops of output levels of data voltages due to a load of the touch display panel 110 seriously occur at an initial section of a touch display block (e.g., at the beginning of a touch display block), control is performed such that degrees by which data voltages are overdriven are different according to sections during one display driving interval, that is, in one touch display block, to allow each sub-pixel SP to accurately express a gradation corresponding to external data DATA0.

Alternatively, more specifically, overdriving of data voltages respectively supplied to sub-pixel rows can be differently controlled within one touch display block.

As an example, when external data DATA0 is received, the image data output unit 142 can upwardly adjust the gradation of the external data DATA0 by using a look-up table LUT.

The look-up table LUT can include information on the gradation of the external data DATA0, the order in which the external data DATA0 is output, and the gradation of image data DATA (e.g., the adjusted/compensated data) obtained by upwardly adjusting the gradation of the external data DATA0.

That is, when the external data DATA0 is received, the image data output unit 142 can output image data DATA having a gradation corresponding to the gradation of the external data DATA0 and the order in which the external data DATA0 is output which are stored in the look-up table LUT.

Accordingly, output data voltages are overdriven based on values independently set according to sub-pixel rows within a touch display block, making it possible to further reduce the difference between output levels of data voltages.

Figure 8:
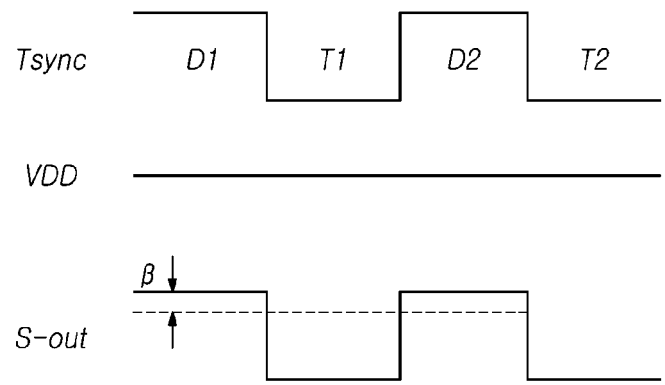
Figure 9:
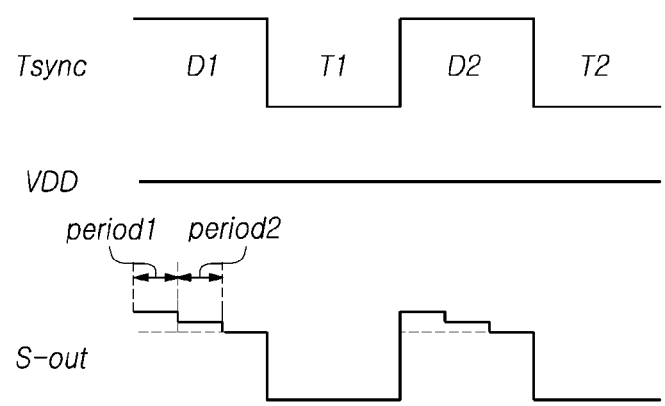

FIGS. 8 to 10 are views illustrating examples of a data voltage output from the data driving circuit 130 when image data DATA obtained by upwardly adjusting the gradation of external data DATA0 is output from the controller 140 of FIG. 7.

Referring to FIG. 8, when external data DATA0 is received, the controller 140 outputs image data DATA obtained by upwardly adjusting the gradation of the external data DATA0. The data driving circuit 130 receives the image data DATA having the upwardly-adjusted gradation, and outputs a data voltage corresponding to the received image data DATA.

That is, as illustrated in FIG. 8, the data driving circuit 130 can output a data voltage overdriven by a predetermined voltage 13 as compared with a data voltage corresponding to an actual gradation.

During a display driving interval, a data voltage, which has a voltage higher than that of the actual data, is output, making it possible to reduce a drop in the output level of a data voltage and prevent an image abnormality due to the drop in the output level of the data voltage.

Referring to FIG. 9, when external data DATA0 is received, the controller 140 may upwardly adjust the gradation of the external data DATA0 according to the order in which the external data DATA0 is output.

As an example, the controller 140 can cause a ratio, in which a gradation of external data DATA0 output for a first term (e.g., first period) in a display driving interval is upwardly adjusted, to be different from a ratio, in which a gradation of external data DATA0 output for a second term (e.g., second period) after the first term is upwardly adjusted.

Accordingly, the data driving circuit 130 may output a data voltage such that a degree by which a data voltage output for the first term is overdriven is different from a degree by which a data voltage output for the second term is overdriven.

That is, in response to the external data DATA0 having the same gradation, the data driving circuit 130 can output a data voltage having a first level for the first term (e.g., first period), and output a data voltage having a second level lower than the first level for the second term (e.g., second period); and a sub-pixel SP, to which the data voltage having the first level is applied, and a sub-pixel SP, to which the data voltage having the second level is applied, end up actually express the same gradation level to the viewer.

As described above, the degree of overdriving is increased during an interval in which drops in output levels of data voltages seriously occur due to a load of the touch display panel 110, to prevent the occurrence of an image abnormality due to the difference between output levels of data voltages.

The controller 140 according to embodiments of the present disclosure can differently apply overdriving to respective sub-pixel rows within one touch display block (e.g., the compensation adjustment can taper off after the start of a new display driving interval that occurs after a touch driving interval).

Referring to FIG. 10, a situation in which the number of rows of sub-pixels SP arranged in one touch display block driven during one display driving interval is 160 is described as an example.

When external data DATA0 is received, the controller 140 checks the gradation of the external data DATA0 and a row of sub-pixels SP to which the external data DATA0 is output.

As an example, when external data DATA0 having 127 gray is received and a row of sub-pixels SP to which the relevant external data DATA0 is a first row, that is, row #1, the controller 140 converts the external data DATA0 having 127 Gray into image data DATA having 134 gray, and outputs the image data DATA having 134 gray to the data driving circuit 130.

Also, when a row of sub-pixels SP to which external data DATA0 having the same gradation is output is a second row, that is, row #2, the controller 140 converts the external data DATA0 having 127 gray into image data DATA having 130 gray, and outputs the image data DATA having 130 gray to the data driving circuit 130.

Accordingly, gradations can be independently and upwardly adjusted according to respective sub-pixel rows within one touch display block (e.g., earlier rows can receive a larger upward adjustment than later rows).

That is, even when each sub-pixel row receives external data DATA0 having the same gradation, a gradation of image data DATA, which is obtained by upwardly adjusting the gradation of the external data DATA0 and is output, may be different for each sub-pixel row, and a level of a data voltage output from the data driving circuit 130 may also be different for each sub-pixel row.

As described above, the gradation of image data DATA is independently adjusted in each sub-pixel row within one touch display block, and thus, even when drops in output levels of data voltages or the difference between output levels of data voltages exists, a gradation corresponding to external data DATA0 can be displayed through the touch display panel 110.

Figure 11:
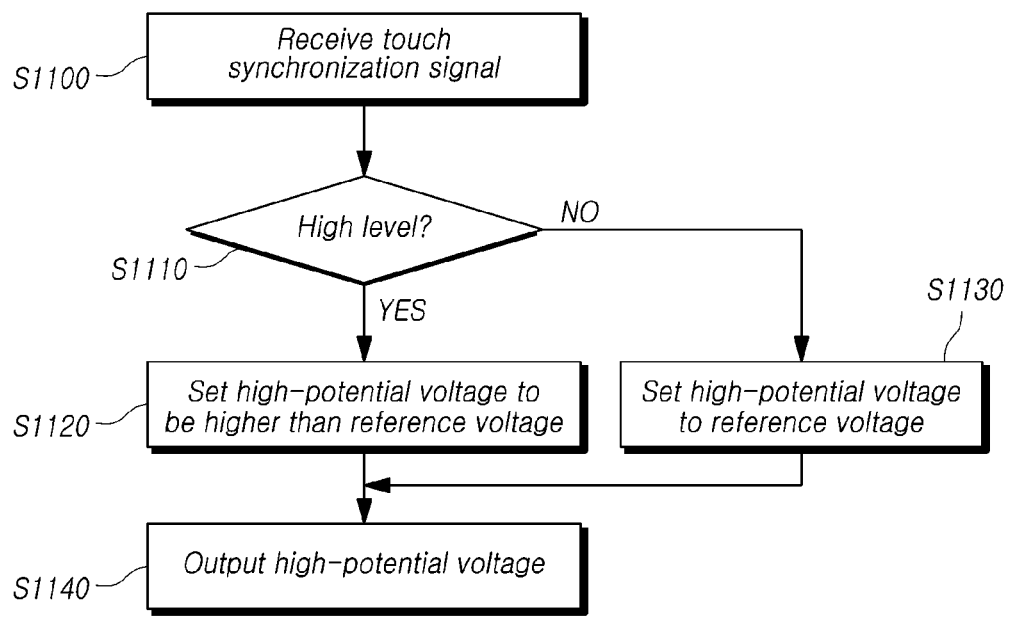
FIG. 11 is a flowchart illustrating the process of a driving method of a power output circuit according to embodiments of the present disclosure.

FIG. 11 is a flowchart illustrating a driving method of the power output circuit 150 according to embodiments of the present disclosure.

Referring to FIG. 11, in operation S1100, the power output circuit 150, according to embodiments of the present disclosure, receives a touch synchronization signal Tsync output from the controller 140.

In operation S1110, the power output circuit 150 determines whether the received touch synchronization signal Tsync has a high level.

When the received touch synchronization signal Tsync has a high level, the power output circuit 150 sets an output value of a high-potential voltage VDD to be higher than a reference voltage, in operation S1120, and outputs the high-potential voltage VDD, of which the output value is set to be higher than the reference voltage, in operation S1140.

When the received touch synchronization signal Tsync has a low level, the power output circuit 150 sets an output value of the high-potential voltage VDD to the reference voltage in operation S1130, and outputs the high-potential voltage VDD, of which the output value is set to the reference voltage (e.g., default VDD or base level VDD), in operation S1140.

Accordingly, during a display driving interval, the high-potential voltage VDD of which the output value is set to be high is output, making it possible to reduce a drop in the output level of the high-potential voltage VDD.

Figure 12:
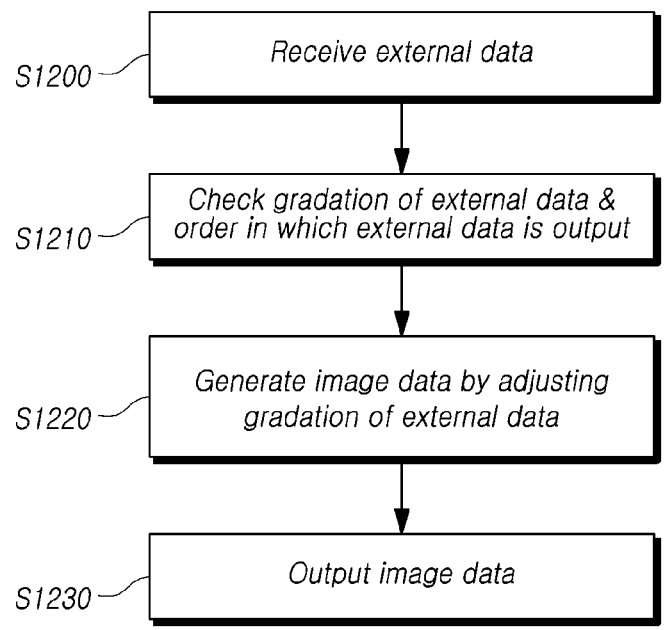
FIG. 12 is a flowchart illustrating the process of a driving method of a controller according to embodiments of the present disclosure.

FIG. 12 is a flowchart illustrating a driving method of the controller 140 according to embodiments of the present disclosure.

Referring to FIG. 12, in operation S1200, the controller 140 according to embodiments of the present disclosure receives external data DATA0 from the outside (e.g., an external input device).

In operation S1210, the controller 140 checks the gradation of the external data DATA0 received from the outside and the order in which the external data DATA0 is to be output, that is, a row of sub-pixels SP within a touch display block.

The controller 140 generates image data DATA according to a gradation, which corresponds to the gradation of the external data DATA0 and the order in which the external data DATA0 is to be output, in operation S1220, and outputs image data DATA, obtained by adjusting the gradation of the external data DATA0, to the data driving circuit 130 in operation S1230.

The data driving circuit 130 supplies respective sub-pixels SP with data voltages corresponding to the image data DATA having the adjusted gradation.

Accordingly, independently-overdriven data voltages are supplied to respective sub-pixel rows within one touch display block, to prevent the occurrence of an image abnormality due to the difference between data voltages.

According to the above-described embodiments of the present disclosure, in the touch display device 100 that alternately performs display driving and touch driving in one frame, a high-potential voltage VDD output to the data driving circuit 130 is set to be high and is output during a display driving interval, to reduce a drop in the output level of the high-potential voltage VDD, thereby making it possible to prevent an image abnormality due to the drop in the output level of the high-potential voltage VDD.

Also, during a display driving interval, the gradation of input image data (external data) received from the outside is upwardly adjusted and the input image data having the upwardly-adjusted gradation is output to the data driving circuit 130, and thus, the data driving circuit 130 outputs overdriven data voltages, making it possible to reduce drops in output levels of data voltages.

Also, the gradation of input image data (external data) is independently adjusted according to the order in which the input image data is output, to reduce the difference between output levels of data voltages output from the data driving circuit 130 and prevent the occurrence of an image abnormality due to a difference between the output levels of the data voltages.

The above description is merely provided as an example of the technical idea of the present disclosure, and those having ordinary knowledge in the technical field to which the present disclosure pertains will appreciate that various modifications and changes in form can be made to the embodiments described herein without departing from the features of the present disclosure. Also, the embodiments disclosed in the present disclosure are intended not to limit but to describe the technical idea of the present disclosure, and thus do not limit the scope of the technical idea of the present disclosure. The scope of the present disclosure should be construed based on the appended claims, and all of the technical ideas included within the scope equivalent to the appended claims should be construed as being included within the scope of the present disclosure.

What is claimed is:

1. A touch display device comprising:
a controller configured to: output a synchronization signal having a first level during a display driving interval and having a second level during a touch driving interval;
a power output circuit configured to:
receive the synchronization signal from the controller,
in response to receiving the synchronization signal having the first level, set an output value of a high-potential voltage to a first voltage during and throughout the display driving interval, and
in response to receiving the synchronization signal having the second level, set the output value of the high-potential voltage to a second voltage that is lower than the first voltage during and throughout the touch driving interval; and
a data driving circuit configured to:
receive image data from the controller, and output data voltages according to the image data by using the high-potential voltage received from the power output circuit to power the data driving circuit.

2. The touch display device of claim 1, wherein the controller is further configured to: receive external data from an external input source, and upwardly adjust a gradation of the external data to generate the image data and output the image data to the data driving circuit, wherein the gradation of the external data is upwardly adjusted differently according to an order in which the image data is to be output by the touch display device during the display driving interval.

3. The touch display device of claim 1, wherein the controller is further configured to: receive first external data and second external data both having a first gradation from an external input source, output first image data having a second gradation different from the first gradation to the data driving circuit by upwardly adjusting the first external data having the first gradation received for a first period within one display driving interval, and output second image data having a third gradation different form the second gradation and the first gradation to the data driving circuit by upwardly adjusting the second external data having the first gradation received for a second period after the first period within the one display driving interval.

4. The touch display device of claim 1, wherein the controller is further configured to: receive external data from an external input source, upwardly adjust a gradation of the external data to generate the image data by using a look-up table comprising information on the gradation of the external data, an order in which the image data corresponding to the external data is to be output by the touch display device, and a gradation of the image data obtained by upwardly adjusting the gradation of the external data, and output the image data to the data driving circuit.

5. The touch display device of claim 1, wherein the controller is further configured to: output the synchronization signal having the first level and the synchronization signal having the second level in an alternating manner during one image frame.

6. The touch display device of claim 1, further comprising: a touch display panel including gate lines, data lines and touch electrodes, wherein the touch display panel is configured to receive the data voltages from the data driving circuit and operate in a display mode during at least two display driving intervals within one image frame, and receive a touch driving signal and operate in a touch mode during at least two touch driving intervals within the one image frame.

7. The touch display device of 6, wherein the touch electrodes are divided into a plurality of blocks and driven based on a LHB sensing scheme.

8. A touch display device comprising:
a touch display panel including gate lines, data lines and touch electrodes, wherein the touch display panel is configured to operate in a display mode during at least two display driving intervals within one image frame and operate in a touch mode during at least two touch driving intervals within the one image frame;
a data driving circuit configured to drive the data lines arranged in the touch display panel;
a controller configured to:
receive external data from an external input source, and
upwardly adjust a gradation of the external data to generate image data and output the image data to the data driving circuit; and
a power output circuit configured to:
receive a synchronization signal having a first level or a second level from the controller,
in response to receiving the synchronization signal having the first level, set an output value of a high-potential voltage to a first voltage during and throughout the at least two display driving intervals, and
in response to receiving the synchronization signal having the second level, set the output value of the high-potential voltage to a second voltage that is lower than the first voltage during and throughout the at least two touch driving intervals,
wherein the gradation of the external data is upwardly adjusted differently according to an order in which the image data is output to the data driving circuit.

9. The touch display device of claim 8, wherein the controller is further configured to: receive first external data and second external data both having a first gradation from the external input source, convert the first external data into first image data having a second gradation different from the first gradation by upwardly adjusting the first external data having the first gradation received for a first period within one display driving interval, and output the first image data to the data driving circuit, and convert the second external data into second image data having a third gradation different from the first gradation and the second gradation by upwardly adjusting the second external data having the first gradation received for a second period within the one display driving interval, and output the second image data to the data driving circuit.

10. The touch display device of claim 8, wherein the controller is further configured to: independently adjust the gradation of the external data according to an order in which the image data is output to the data driving circuit during one display driving interval.

11. The touch display device of claim 8, wherein the data driving circuit is further configured to: receive first external data for a first period within one display driving interval and second external data for a second period after the first period within the one display driving interval, from the external input source, wherein the first and second external data both have a first gradation, output first data voltages corresponding to the first external data to the touch display panel, during the first period within the one display driving interval, and output second data voltages corresponding to the second external data to the touch display panel, during the second period within the one display driving interval, wherein the first data voltages are different than the second data voltages.

12. The touch display device of claim 8, wherein the data driving circuit is further configured to: receive the image data from the controller, and output data voltages according to the image data by using the high-potential voltage received from the power output circuit to power the data driving circuit.

13. The touch display device of claim 12, wherein the controller is further configured to: output the synchronization signal having the first level and the synchronization signal having the second level in an alternating manner during one image frame.

14. The touch display device of claim 8, wherein the controller is further configured to: upwardly adjust the gradation of the external data to generate the image data by using a look-up table comprising information on the gradation of the external data, an order in which the image data corresponding to the external data is to be output by the touch display device, and a gradation of the image data obtained by upwardly adjusting the gradation of the external data, and output the image data to the data driving circuit based on the information in the look-up table.

15. A touch display device comprising:
a touch display panel including gate lines, data lines and touch electrodes, wherein the touch display panel is configured to apply a common display driving voltage to the touch electrodes during at least two display driving intervals within one image frame, and apply a touch driving signal to the touch electrodes during at least two touch driving intervals within the one image frame;
a controller configured to:
receive external data from an external input source,
upwardly adjust a gradation of the external data to generate image data, and
output the image data to the data driving circuit for driving the data lines;
a power control circuit configured to:
output a high-potential voltage having a first voltage level during and throughout the at least two display driving intervals within one image frame, and a second voltage level lower than the first voltage level to the data driving circuit during and throughout the at least two touch driving intervals within one image frame; and
a data driving circuit configured to:
receive, during one of the at least two display driving intervals, the image data from the controller and the high-potential voltage having the first voltage level, and
drive, during the one of the at least two display driving intervals, the data lines based on the image data and the high-potential voltage.

16. The touch display device according to claim 15, wherein the high-potential voltage having the first voltage level is received by the data driving circuit during the display driving interval immediately after completion of a preceding touch driving interval.

17. The touch display device of claim 15, wherein the power output circuit is further configured to: receive a synchronization signal having a first level or a second level from the controller, in response to receiving the synchronization signal having the first level, set an output value of the high-potential voltage to the first voltage level, and in response to receiving the synchronization signal having the second level, set the output value of the high-potential voltage to the second voltage that is lower than the first voltage level, wherein the data driving circuit is further configured to: receive the image data from the controller, and output data voltages according to the image data by using the high-potential voltage received from the power output circuit to power the data driving circuit.

18. The touch display device of claim 17, wherein the controller is further configured to: output the synchronization signal having the first level and the synchronization signal having the second level in an alternating manner during the one image frame.

19. The touch display device of claim 15, wherein the controller is further configured to: upwardly adjust the gradation of the external data to generate the image data by using a look-up table comprising information on the gradation of the external data, an order in which the image data corresponding to the external data is to be output by the touch display device, and a gradation of the image data obtained by upwardly adjusting the gradation of the external data, and output the image data to the data driving circuit based on the information in the look-up table.

* * * * *